No. 766,926. PATENTED AUG. 9, 1904.
C. N. BEAL.
VEHICLE WHEEL.
APPLICATION FILED JAN. 28, 1904.
NO MODEL.
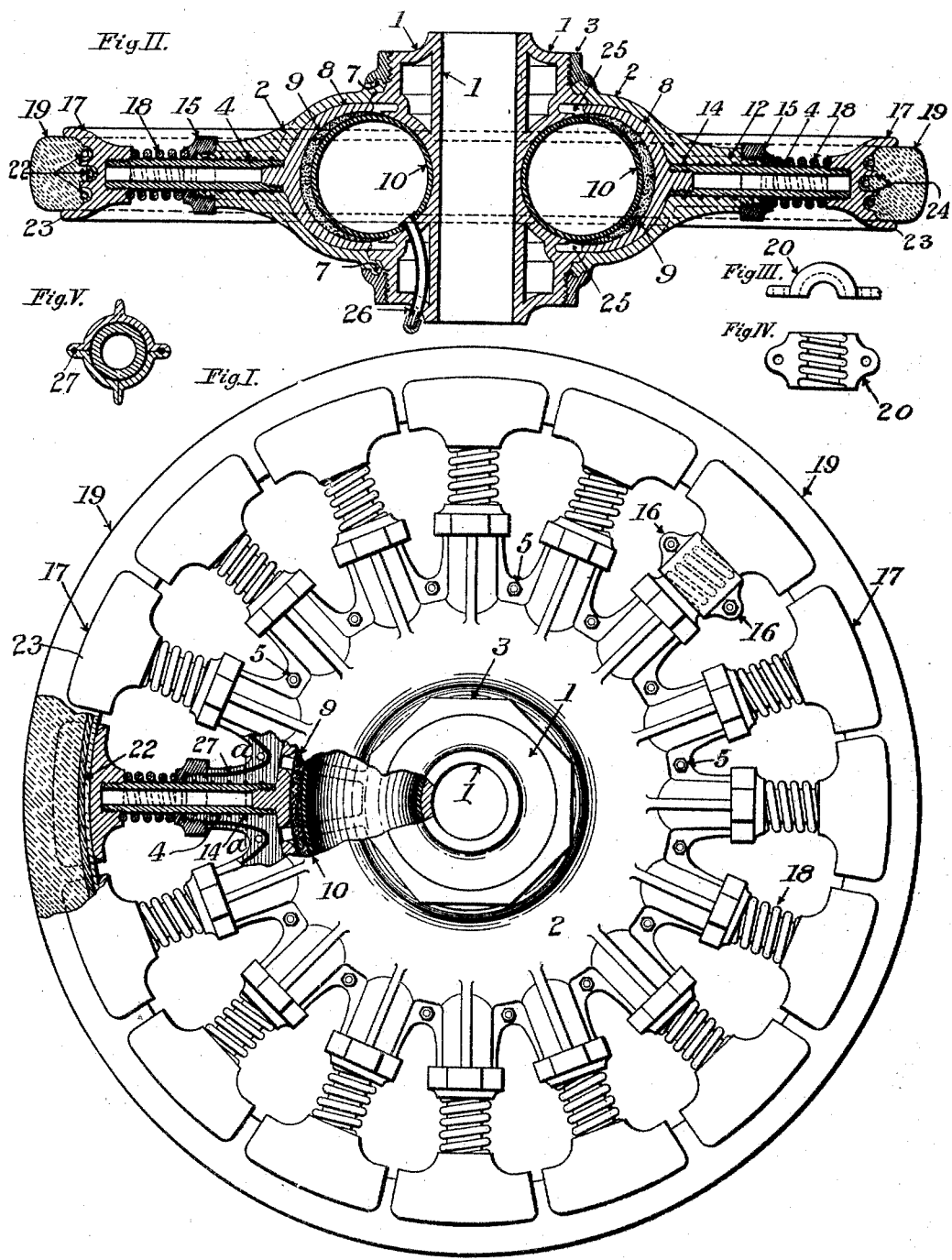
WITNESSES:
INVENTOR:
Carroll N. Beal
By J. Richards &c., ATTORNEYS.

No. 766,926. Patented August 9, 1904.

UNITED STATES PATENT OFFICE.

CARROLL N. BEAL, OF SAN FRANCISCO, CALIFORNIA.

VEHICLE-WHEEL.

SPECIFICATION forming part of Letters Patent No. 766,926, dated August 9, 1904.

Application filed January 28, 1904. Serial No. 191,028. (No model.)

*To all whom it may concern:*

Be it known that I, CARROLL N. BEAL, a citizen of the United States, residing at San Francisco, county of San Francisco, and State of California, have invented certain new and useful Improvements in Vehicle-Wheels; and I hereby declare the following to be a full, clear, and exact description of the same, reference being had to the accompanying drawings, forming a part of this specification.

This invention relates to vehicle-wheels, especially to elastic, resilient, or rebounding wheels, such as are employed for automobile-carriages driven by motors or engines, and to certain improvements in such wheels, as herein explained and illustrated by drawings that form a part of this specification.

My improvements consist in a wheel provided with three elastic and resilient members, the main one an annular pneumatic cushion disposed around the nave of the wheel, sealed and incased by metal to prevent rupture, longitudinally-movable spokes between this central resilient cushion and the rim, spiral springs around these spokes for purposes hereinafter described, an elastic but non-extensible outer tire to resist centrifugal and lateral strains; also consists in various constructive and operative features that will be hereinafter more fully explained in combination with the drawings.

The objects of my invention are, first, to remove in such wheels the main resilient function from the external tire, which is exposed to accidents and destructive wear; second, to dispose a pneumatic chamber or cushion in a secure position around the nave of the wheel, to reduce its size, seal, confine, reinforce, and protect the same; third, to provide a non-extensible outer tire of solid section with a degree of elasticity such as is required to protect it from abrasive wire from ground contact and from the effects of centrifugal and lateral strains, but readily transmitting compression to the main resilient members; fourth, to provide a third means of resilient action in the form of spiral springs to hold the different members in contact, but reducible to a rigid strut in case of accident to the other elastic members. To these ends I provide devices substantially as shown in the accompanying drawings, now to be referred to.

Figure I is a side elevation, partially in section, of a vehicle-wheel embodying my invention; Fig. II, a central section through the same wheel parallel to its axis; Fig. III, an end view of a clamp to hold and reinforce the coil-springs around the spokes; Fig. IV, a face view of Fig. III; Fig. V, a section on the line $a\ a$ in Fig. I.

In the construction of what are called "elastic" and "resilient" wheels for vehicles, especially automobile carriages driven by power, the yielding function, commonly a pneumatic cushion or chamber, is provided for in the outer tire, where there is especial exposure to wear, puncture, and other accidents. This construction demands an air-containing chamber of great length and bulk, exposed to centrifugal and lateral strains at high speeds, and other impediments that arise from adapting the tire or cushion to the two different purposes of a wheel-tire and a pneumatic cushion.

In my invention, as already stated, the elastic and resilient functions are divided among three separate means, the principal one being disposed around the nave of the wheel and secure from the exposed conditions that pertain to a tire.

I will now proceed by the aid of the drawings to explain the particular construction of a wheel to embody my improvements.

1 is a central shell or sleeve bearing to fit on the axle of a vehicle or to receive an inner bearing that fits on the axle. The central member with two disks 2 held to the shell 1 by the screw-collars 3 constitute the main body of the wheel. Said central member is hereinafter referred to as the "nave."

The disks 2 can be made in pairs, as shown, or may be in sectors or parts to correspond with the number of spokes 4 and are carefully bored or otherwise fitted to receive the required number of these, sixteen being shown in the present drawings. The parts 2, whether disks or sectors, are also held by bolts 5, as seen in Fig. I, and by a groove and interlocking annular ledges 7 on the inner faces of the screw-collars 3, as seen in Fig. II. In the meeting joint between the disks 2 and between the spokes is inserted a packing 27 of rubber or of any fibrous material commonly used as packing disposed as shown in Fig. I.

The spokes 4 are fitted at their inner ends with saddle-pieces 8, that bear upon a continuous pad 9, that fits over and protects the annular pneumatic cushion 10. The member 9 is of some strong fibrous material that will partake of the movement in compressing the cushion 10 and is supported at the sides by the saddle-pieces 8, that extend to and beyond the center of the member 9 and the pneumatic cushion 10, as shown in Fig. II.

The spokes 4 are extended through the bearings 12 in the disks 2 by a close but free working fit, the bearings 12 being provided with annular grooves 14 for the reception and distribution of suitable lubricants. The sockets or bearings 12 are closed and sealed by the combined nuts and screw packing-glands 15, which in conjunction with the packing introduced between the disks 2, as shown at 27, Fig. I, serve to exclude dust and moisture from the working parts within the nave of the wheel. Between the glands 15 and the felly members 17 are interposed stiff spiral springs 18, that form one of the resilient elements in the wheel and also by their continual outward strain serve to hold the movable parts in contact and prevent lost motion or noise. These springs 18 have also an emergency purpose in case the pneumatic cushion 10 is ruptured or fails. Should this occur, these springs 18 are housed and replaced by clamps 20, (shown in Figs. III and IV,) which are recessed so as to fit over the springs 18, and thus form rigid struts between the nuts 15, the disks 2, and the rim members 17, transmitting pressure from the tire 19 directly to the shell 1, as shown at 16 in Fig. I. In this case the outer rim or tire 19 provides sufficient resiliency until more complete repairing can be done. One of these clamps 20 as applied is shown at 16 in Fig. I. The outer member or tire 19 is also made of resilient material, but without air-cells, and is held from extension by endless metallic ropes 22, embedded in the material, as shown in Fig. II. These ropes 22 may be more or less in number and differently disposed, their function being to prevent the tire 19 from stretching, also to transmit compression, lateral pressure, or other strain to the adjacent spoke members 4. The tire is held laterally by the flanges 23 on the rim members 17 and also when required by radial ribs embedded in the tire, as shown at 24 in Fig. II.

The spokes 4 are preferably made of a hollow section and firmly secured into the rim members 17 and the saddles 8, which latter have an inward range, as indicated by the recesses 25 in Fig. II, extending well below the center of the cushion 10 and the member 9.

It will be seen that the pneumatic cushion 10, the saddle member 8, and the pad member 9 are wholly inclosed and sealed in metal structure, the latter, 10, being surrounded to the extent of two hundred and forty degrees of arc by the member 9 and are entirely inclosed in by metal. This guards against the rupture of the pneumatic cushion 10, which is filled with air under pressure through the charging-tube 26 in the usual manner.

Having thus explained the nature and objects of my invention and a manner of applying the same in practice, what I claim as new, and desire to secure by Letters Patent, is—

1. A vehicle-wheel consisting of a nave, an annular pneumatic cushion disposed around said nave, a series of saddle-pieces mounted on said cushion, radial spokes mounted on said saddle-pieces, felly members borne on the outer ends of said spokes, an elastic tire sustained by said felly members, and means for preventing said tire from stretching, substantially as specified.

2. In a vehicle-wheel, a nave, an annular pneumatic cushion disposed around said nave, saddle-pieces mounted on said cushion, partially surrounding the same, a continuous pad of fibrous material interposed between said cushion and said saddle-pieces, radial spokes mounted on said saddle-pieces, felly members carried on said spokes, and an elastic tire sustained by said felly members, substantially as specified.

3. In a vehicle-wheel, a nave, an annular pneumatic cushion around said nave, saddle-pieces mounted on said cushion, partially surrounding the same, radial spokes mounted on said saddle-pieces, a tire sustained on said spokes, metallic disks embracing said saddle-pieces and spokes on each side, fitted around said nave, provided with annular ledges, and screw-collars grooved to fit said ledges, threaded on said nave for removably holding said disks in place, substantially as specified.

4. In a vehicle-wheel, a metallic shell constituting a nave, an annular pneumatic cushion around said nave, saddle-pieces mounted on said cushion, partially surrounding the same, radial spokes mounted on said saddle-pieces, felly members on said spokes, a tire on said felly members, disks embracing said saddle-pieces on each side, fitted around said nave, loosely fitted around said spokes, means for removably holding said disks to said nave, and packing-glands for securely closing the disk-fittings around said spokes, screw-threaded to hold said disks and spokes in a true central plane, substantially as specified.

5. In a vehicle-wheel, a metallic shell constituting a nave, an annular pneumatic cushion around said nave, saddle-pieces mounted on said cushion, partially surrounding the same, radial spokes mounted on said saddle-pieces, felly members on said spokes, a tire on said felly members, disks embracing said saddle-pieces on each side, fitted around and removably secured to said nave, said disks loosely fitted around said spokes, a packing in the junction of said disks between the spokes, and packing-glands securely closing the disk-fittings around said spokes, with means for securely holding said disks and spokes in a true central plane, substantially as specified.

6. In a vehicle-wheel, a nave, an annular pneumatic cushion around said nave, saddle-pieces mounted on said cushion, partially surrounding the same, adapted to have radial play thereon, a protective pad between said cushion and said saddle-pieces, radial spokes mounted on said saddle-pieces, felly members on said spokes, an elastic tire sustained on said felly members, with means for holding said tire against extension, disks embracing said saddle-pieces and spokes on each side, fitted around said nave, with means for securing said disks to said nave, said disks loosely fitted around said spokes, with means for securely closing and packing the apertures between the disks in which the spokes play, substantially as specified.

7. In a vehicle-wheel, a nave, an annular pneumatic cushion around said nave, saddle-pieces mounted on said cushion, partially surrounding the same, radial spokes mounted on said saddle-pieces, felly members on said spokes, an elastic tire sustained on said felly members, disks embracing said saddle-pieces and spokes on each side, fitted around said nave, with means for securing said disks to said nave, said disks loosely fitted around said spokes, with packing-glands for securely closing and packing the apertures between the disks in which the spokes play, and resilient springs on said spokes between said packing-glands and said felly members to maintain tension in the said tire, substantially as specified.

8. In a vehicle-wheel, having a nave, a pneumatic cushion surrounding the nave, radially-movable spokes mounted on said cushion, disks fitted to and supported on said nave and loosely embracing said spokes on each side, felly members on said spokes, an elastic tire sustained on said felly members, and springs on said spokes between said felly members and said embracing-disks, to maintain tension in said tire, and removable clamps for embracing said springs and reinforcing them in case of failure, substantially as specified.

9. In a vehicle-wheel having a nave, a pneumatic cushion surrounding said nave, radially-movable spokes mounted on said cushion with felly members on said spokes, an elastic tire sustained on said felly members having a provision whereby said tire is held against extension, substantially as specified.

10. In a vehicle-wheel having a nave, a pneumatic cushion surrounding the nave, radially-movable spokes mounted on said cushion, felly members on said spokes and springs on said spokes to press outward said felly members, an elastic tire mounted on said felly members, having inextensible cords embedded in the substance of said tire to render the same inextensible, substantially as specified.

11. In a vehicle-wheel provided with a central elastic cushion, radially-movable spokes mounted on said cushion, and separate felly members on said spokes, an elastic tire or rim mounted on said felly members, having inextensible cords embedded in its substance, whereby said tire is held against extension, substantially as specified.

12. In a vehicle-wheel provided with means for radial expansion, an elastic tire or rim having embedded in its substance rigid cords whereby the said tire is prevented from elongation while subject to compression, substantially as specified.

In testimony whereof I have signed my name to this specification in the presence of two subscribing witnesses.

CARROLL N. BEAL.

Witnesses:
 JOHN H. WARE,
 M. L. JONES.